United States Patent
Ferguson et al.

(10) Patent No.: US 8,010,990 B2
(45) Date of Patent: Aug. 30, 2011

(54) ACCELERATION OF PACKET FLOW CLASSIFICATION IN A VIRTUALIZED SYSTEM

(75) Inventors: Conor Ferguson, Ballina (IE); Stephen Doyle, Ennis (IE)

(73) Assignee: Intel Corporation, Santa Clara, CA (US)

( * ) Notice: Subject to any disclaimer, the term of this patent is extended or adjusted under 35 U.S.C. 154(b) by 965 days.

(21) Appl. No.: 11/588,469

(22) Filed: Oct. 26, 2006

(65) Prior Publication Data

US 2008/0148341 A1  Jun. 19, 2008

(51) Int. Cl.
H04L 29/06 (2006.01)
(52) U.S. Cl. .......................................................... 726/1
(58) Field of Classification Search .......... 713/151–153, 713/162, 189; 370/235, 238, 351, 389, 392, 370/401, 412, 466; 726/1, 13
See application file for complete search history.

(56) References Cited

U.S. PATENT DOCUMENTS

| | | | | |
|---|---|---|---|---|
| 6,754,662 | B1 * | 6/2004 | Li | 707/101 |
| 2002/0126672 | A1 * | 9/2002 | Chow et al. | 370/392 |
| 2003/0014627 | A1 * | 1/2003 | Krishna et al. | 713/153 |
| 2004/0170170 | A1 * | 9/2004 | Joung et al. | 370/389 |
| 2006/0221832 | A1 * | 10/2006 | Muller et al. | 370/235 |
| 2007/0245348 | A1 * | 10/2007 | Araujo et al. | 718/1 |

OTHER PUBLICATIONS

Chapter 4; Recursive Flow Classification: An Algorithm for Packet Classification on Multiple Fields, pp. 105-160.; http://klamath.stanford.edu/~pankaj/thesis/chapter4.pdf. Cite last visited Oct. 24, 2006.
Kent and Atkinson; Standard Track,; Security Architecture for the Internet Protocol.; Nov. 1998.; pp. 1-66.; http://www.ietf.org/rfc/rfc2401.txt.; cite last visited Oct. 24, 2006.
Uhlig et al.; Intel Virtualization Technology; IEEE Computer Society,; 0018-9162, May 2005, ftp://download.intel.com/technology/computing/vptech/vt-ieee-computer-final.pdf; pp. 48-56. Cite last visited Oct. 24, 2006.

* cited by examiner

*Primary Examiner* — Brandon S Hoffman
(74) *Attorney, Agent, or Firm* — Caroline M. Fleming

(57) ABSTRACT

A computer system having a plurality of virtual machines is provided. Each virtual machine in the computer system has an associated policy (rules) database and database (policy table) for storing rules and a database lookup associated with the policy database. One policy database/database lookup pair per virtual machine allows each virtual machine to have a different set of packet processing rules and security policies for handling the same key. In addition, the policy database associated with one virtual machine may be updated and the database lookup associated with the policy database re-generated independently without requiring any update of the policy database lookups associated with any of the other policy databases in the computer system.

18 Claims, 3 Drawing Sheets

ACCELERATION OF PACKET FLOW CLASSIFICATION IN A VIRTUALIZED SYSTEM

FIELD

This disclosure relates to packet flow classification and in particular to acceleration of packet flow classification in a virtualized system having a plurality of virtual machines.

BACKGROUND

A computer system is a layered device that includes a hardware layer, a firmware and operating system layer, and an applications program layer. The hardware layer of the computer system is often referred to as a physical (hardware) platform. The platform may include processors, chipsets, communications, memory, boards and systems. Typically, a single operating system controls all hardware layer resources in the computer system.

The computer system's physical resources may be virtualized to allow multiple operating systems to run on a single physical platform. A virtualized system may include a virtual machine monitor that arbitrates access to the physical platform's resources so that multiple operating systems can share them. The virtual machine monitor presents to each operating system, a set of platform interfaces that constitute a virtual machine. Thus, one computer system (hardware platform) can function as multiple "virtual" machines (platforms).

The physical platform may include a network processor, that is, a programmable device that is optimized for processing packets at high speed. Typically, the network processor classifies a received packet using a tuple of a set of fields from headers included in the packet. For example, the tuple of a set of fields may include a Transport Control Protocol (TCP) source port field, TCP destination port field, Internet Protocol (IP) source address field and IP destination address field. Using this tuple of a set of fields as a key, a database storing policy entries (policy table or policy database) may be queried to identify a configured policy that dictates how to handle the packet.

The policy entries in the policy database are typically stored as linked lists or as linear arrays. In order to improve searching performance, a lookup mechanism is typically implemented. One implementation of a lookup mechanism is a Recursive Flow Classification (RFC) algorithm which is discussed at http://klamath.stanford.edu/~pankaj/thesis/chapter4.pdf.

One limitation of the RFC algorithm is that lookup efficiency decreases exponentially as the number of policy entries in the database increases. Another limitation is that each time the database is updated an RFC table associated with the database needs to be re-generated. The regeneration process can be quite slow, with the time taken to generate an RFC table from a database being directly proportional to the number of policy entries in the database.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
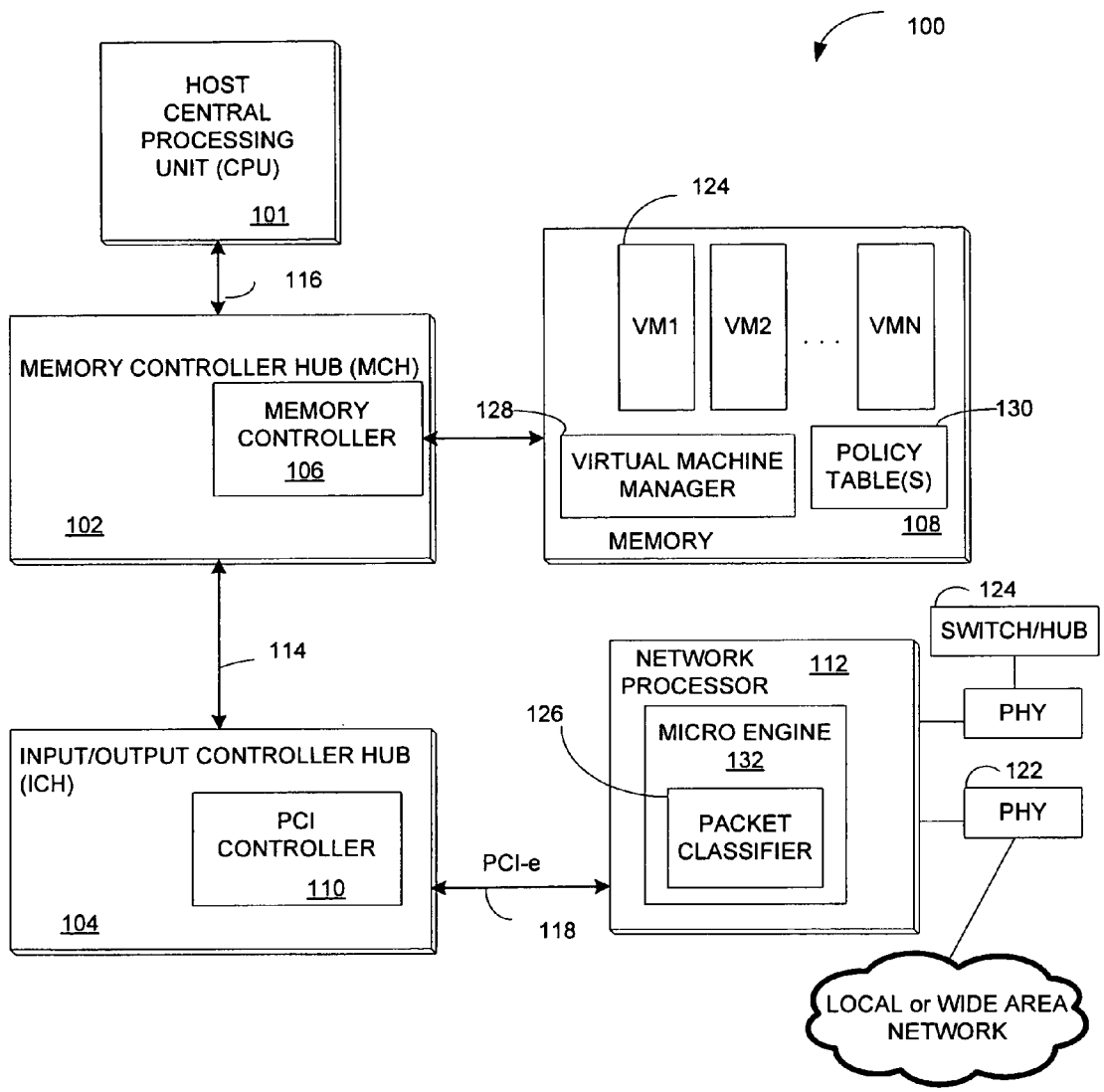
FIG. 1 is a block diagram of a system that includes an embodiment of a packet classifier according to the principles of the present invention.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Typically, flow classification acceleration supports a single operating system. However, in a virtualized system each "virtual" machine may have a different operating system with each operating system having a different flow classification policy. For example, each operating system may have different security policies and packet processing rules. Combining all of the packet processing rules from each virtual machine into a single database (policy table) shared among all of the virtual machines may result in a decrease in the database lookup efficiency. Furthermore, a single database may require resolving conflicting packet processing rules for different virtual machines associated with the same key (for example, a tuple of a set of fields from headers included in the packet).

In an embodiment of the invention, each virtual machine in a computer system has an associated policy (rules) database (policy table) for storing rules and a database lookup associated with the policy database. One policy database/database lookup pair per virtual machine allows each virtual machine to have a different set of packet processing rules and security policies for handling the same key.

Furthermore, the policy database associated with one virtual machine may be updated and the database lookup associated with the policy database re-generated independently without requiring any update of the policy database lookups associated with any of the other policy databases in the system.

An embodiment of the invention will be described for a system that handles Internet Protocol security architecture (IPsec) packets. IPsec enables selection of security protocols and determines algorithms and cryptographic keys to be used. The security services include access control, connectionless integrity, data origin authentication and rejection of replayed packets. IPsec provides security services at the Internet Protocol (IP) layer. IPsec uses two protocols to provide traffic security—Authentication Header (AH) and Encapsulating Security Payload (ESP). These protocols may be applied alone or in combination with each other to provide a desired set of security services in Internet Protocols such as Internet Protocol version 4 (IPv4) and Internet Protocol version 6 (IPv6).

The IPsec affords protection to Internet Protocol (IP) traffic based on requirements defined by a Security Policy Database (SPD) that may be established and maintained by a user or system administrator. For example, a policy or rule may be created in the SPD through an advertised Application Programming Interface (API). The rules and policy entries in the SPD dictate how received data packets (traffic) are handled, that is, the SPD includes actions for handling received packets. Based on Internet Protocol (IP) and Transport Control Protocol (TCP) header information, a received packet may be matched against entries in the SPD and based on the policy or rule in the matching entry, the packet is either discarded, allowed to bypass IPsec or IPsec security services are performed.

FIG. 1 is a block diagram of a system 100 that includes an embodiment of a packet classifier 126 according to the principles of the present invention. The system 100 includes a Host Central Processing Unit (CPU) 101, a Memory Controller Hub (MCH) 102, an I/O Controller Hub (ICH) 104 and a network processor 112. The MCH 102 includes a memory controller 106 that controls communication between the CPU 101 and memory 108. The CPU 101 and MCH 102 communicate over a system bus 116.

The Host Central Processing Unit (CPU) 101 may be any one of a plurality of processors such as a single core Intel® Pentium IV® processor, a single core Intel Celeron processor, an ®XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a Peripheral Component Interconnect (PCI) or Peripheral Component Interconnect Express (PCI-e) bus controller 110 for controlling communication with devices coupled to the ICH 104 that communicate with the ICH over a PCI or PCI-e bus 118.

A network processor 112 that includes an embodiment of a packet classifier 126 according to the principles of the present invention may be coupled to the ICH 104 through the PCI or PCI-e bus 118. The network processor 112 may include at least one micro engine 132 that processes packets which may be received over a wide area network (WAN) through a phy 122 coupled to the network processor or may be received from a local area network (LAN) through a switch or hub 124 coupled to another phy 122.

The system may support virtualization, that is, provide the ability to create separate partitions called "virtual machines". Each virtual machine 124 includes an operating system (guest operating system) and one or more applications and interfaces to a virtual machine manager (VMM) 128. Each operating system operates independently from the operating systems in the other virtual machines 124. The VMM 128 allocates platform resources such as memory to each virtual machine 124.

The VMM 128 runs directly on the system's hardware and emulates a complete hardware environment for each virtual machine 124. The applications and guest operating system in each virtual machine 124 are not aware that they are sharing the system hardware.

Thus, with each virtual machine 124 having its own operating system, different applications and operating system combinations may be executed on the same system 100, for example, both 32-bit and 64-bit guest operating-systems may be provided in the system 100 allowing both 32-bit and 64-bit applications to run on the same system. Also, update and recovery tools may be restricted to one virtual machine 124 and virus-prone activities may be isolated by restricting them to one virtual machine 124 so that they will not infect the entire system.

For example, a portion of a managed computer system 100 may be isolated to perform system upgrades and maintenance without interrupting the end-user, or the same computer system 100 may function independently as both a business and a personal system, keeping software and virus attacks separate or virtual "partitions" may be created in a computer system 100 to isolate multiple user environments.

Each virtual machine 124 has a respective policy table 130 stored in memory 108. One of the micro engines 132 may include a packet classifier 126 to direct a received packet to the policy database (policy table) 130 associated with one of a plurality of virtual machines 124 to identify the processing policy (rule) to handle the received packet.

Figure 2:
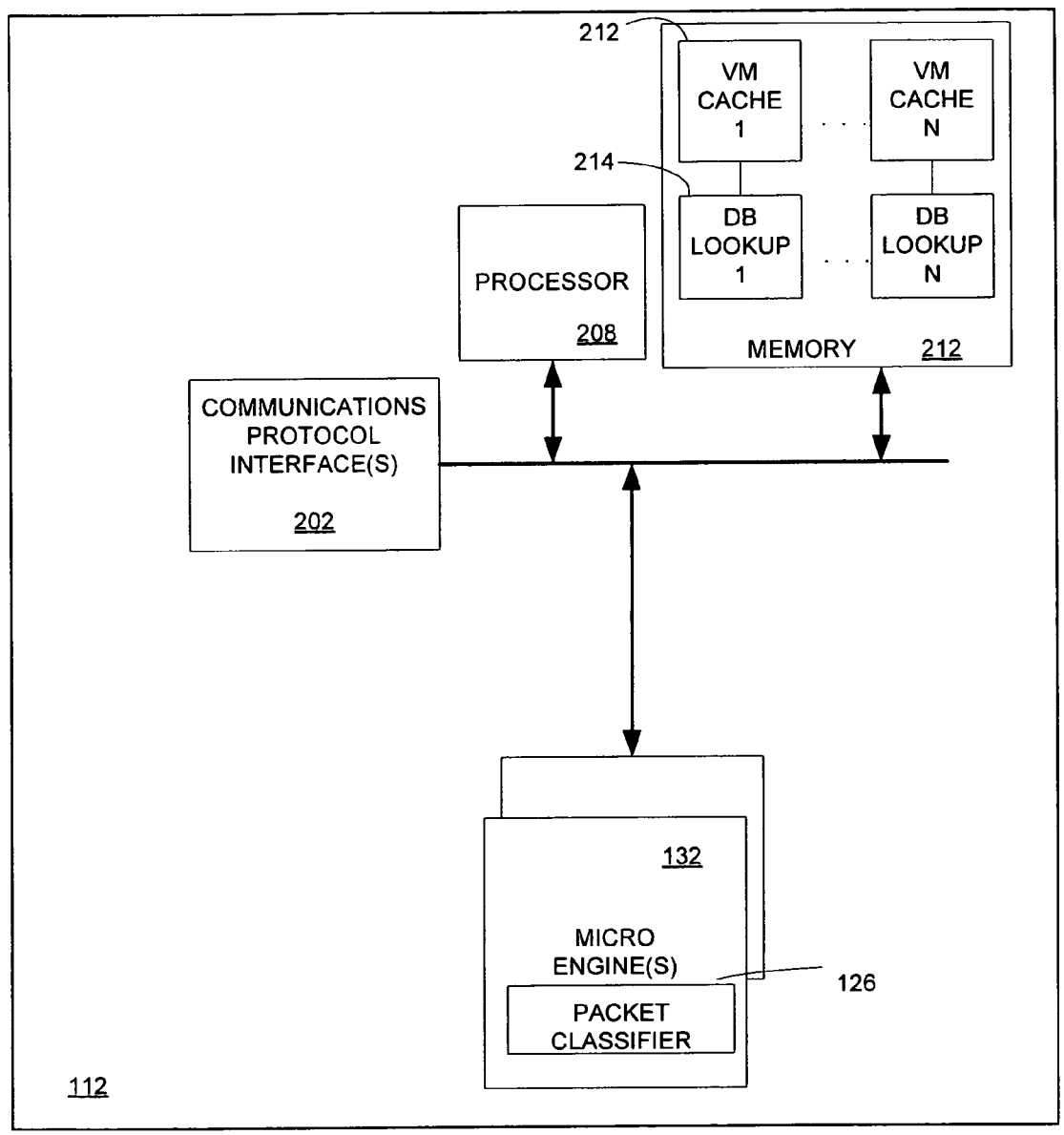
FIG. 2 is a block diagram of an embodiment of the network processor shown in FIG. 1.

FIG. 2 is a block diagram of an embodiment of the network processor 112 shown in FIG. 1. The network processor 112 includes a communications protocol interface 204, a processor (Central Processing Unit (CPU)) 208 and at least one micro engine (acceleration unit) 132. The network processor 112 may perform protocol processing which involves the repeated application of basic operations that includes packet classification and packet modification. Packet classification involves the matching of one or more of the protocol header fields included in the packet against a set of configured rules. Associated with each rule is a set of actions to be applied to the packet if there is a rule match. Methods used for packet classification include exact-match classification, longest-prefix match classification and range-match classification.

Network processing has traditionally been partitioned into control-plane and data-plane processing. Data plane tasks are typically performance-critical and non-complex, for example, classification, forwarding, filtering, header checking modification, protocol conversion and policing. Control plane tasks are typically performed less frequently and are not as performance sensitive as data plane tasks, for example, connection setup and teardown, routing protocols, fragmentation and reassembly.

The CPU 208 may be a 32 bit general purpose processor which may be used for offloading control plane tasks and handling exception packets from the micro engines 132. In an embodiment, each micro engine 132 is a 32-bit processor with an instruction set and architecture specially optimized for fast-path data plane processing. Control and status registers that may be accessed by all of the micro engines 132 may be stored in the memory 212 which is shared by all of the micro engines 132.

The communications protocol interface 202 buffers network packets as they enter and leave the network processor 112. In one embodiment, the communications protocol interface 202 may provide support for handling Gigabit Ethernet packets as they enter and leave the network processor 112.

In the embodiment shown, all of the virtual machines 124 share the micro engines 132 in the network processor 112. Each virtual machine 124 has an associated policy database 130 (FIG. 1) and policy database lookup 214. The policy database lookup 214 is stored in memory 212 that is accessible by all of the micro engines 132. The policy database 130 is stored in memory 108 as discussed in conjunction with FIG. 1. Each virtual machine 124 also includes an associated Virtual Machine (VM) cache table 216 which is a cache of the most recently used rules retrieved by the virtual machine from the associated policy table 130 (FIG. 1).

Each policy database/policy database lookup pair 130, 214 and VM cache table 216 is associated with a unique identifier that uniquely associates the policy database 130 to the virtual machine 124. In an embodiment in which each virtual machine 124 has a respective dedicated network interface, the unique identifier may be the network interface in the network processor 112 through which a packet is received. The network interface dedicated (assigned) to a virtual machine 124 may be one port in the communications protocol interface 202 or in an embodiment having a plurality of communication protocol interfaces 202, each virtual machine 124 may be assigned a communications protocol interface 202.

In the embodiment shown, the network interface through which a packet is received (incoming network interface) is used to identify the policy database 130 to be used for processing the received packet. After the respective policy database 130 has been identified, policy database processing proceeds using the associated policy database lookup 214 to identify a policy rule. After the policy rule is identified, the identified policy rule is used to process the received packet.

The policy rule for the received packet stored in the policy database 130 may be to drop the received packet, forward the packet without processing to the next hop that may be identified from headers in the packet, forward the received packet with the associated policy rule information to the virtual machine 124 associated with the received packet for further processing or other accelerated packet services may be performed on the received packet.

In one embodiment the packet classifier 126 in the micro engine 132 may include a function as shown in Table 1 below to select the policy database/policy data lookup pair 130, 214 based on the network interface through which the packet was received.

TABLE 1

```
Switch (interface)
{
    Case VM1:
        Search policy database for VM[1];
    Case VM2:
        Search policy database for VM[2];
    .
    .
    .
    Case VMN
        Search policy database for VM[N];
}
```

The selection of the particular virtual machine 124 may be made dependent on the interface through which the packet was received. For example, the communications protocol interface 202 may include a plurality of input ports that may be coupled to communication links with a virtual machine 124 associated with each input port.

Each packet received by an input port is forwarded through the communication protocol interface 202 to one of a plurality of micro engines 132. In the embodiment shown, one of the micro engines 132 includes a packet classifier 12 that classifies a packet based on contents of headers included in the packet to determine how to process the packet. Upon receiving a packet, the packet classifier 126 in the micro engine 132 extracts a tuple of a set of fields from the contents of the packet. For example, the tuple of a set of fields may include a Transport Control Protocol (TCP) source port field, TCP destination port field, Internet Protocol (IP) source address field and IP destination address field.

In one embodiment, a five tuple set of fields is selected that includes IP source address field, IP destination address field, IP protocol number and the next-layer source and destination ports. The next-layer may be TCP or User Datagram Protocol (UDP) or any other next-layer.

The five-tuple set of fields (key) is extracted from the packet headers by the packet classifier 126 and may be forwarded to a database lookup 214 associated with the virtual machine 124 to provide an index which may be used to search a packet processing policy database 130.

There are many classification algorithms which may be used by a database lookup that are designed to work in two dimensions, that is, with two header fields. Other classifier algorithms that work with more than two header fields and are commonly referred to as classifiers that perform classification in multiple dimensions.

The Recursive Flow Classification (RFC) algorithm is a multi-dimensional classification algorithm which maps S bits in a packet header to T bits of an identifier (index) to a database/table The RFC algorithm is discussed at http://klamath.stanford.edu/~pankaj/thesis/chapter4.pdf. In each of P phases, the RFC algorithm performs a reduction by mapping one set of values to a smaller set. The mapping is performed recursively through a plurality of phases. The final phase provides a value which corresponds to the class identifier of the packet. In one embodiment, the database lookup 214 uses the RFC algorithm to provide an index to a policy database 130 storing the rule associated with a key.

An embodiment of the invention will be described for the RFC algorithm. However, the invention is not limited to the RFC algorithm. Other embodiments of the invention may use any other fast-path processing algorithm, for example, a binary search algorithm, a backtracking search algorithm, a hierarchical trie query algorithm, a cross producting algorithm, a tuple space search algorithm, a two dimensional search algorithm or any other algorithm for providing an index from a value.

The five-tuple set of fields is forwarded to the database lookup 214 that uses the RFC algorithm and is associated with the virtual machine 124 to find an index to a packet processing policy database 130 associated with the virtual machine 124. Using this tuple of a set of fields as a key, the RFC algorithm in the database lookup 214 provides an index to the policy database 130 which stores policy entries. The policy database 130 may be queried using the index to determine a configured policy that dictates how to handle the packet.

In one embodiment the packet processing policy database is a security policy database (SPD) used to enforce a security policy in an IPsec environment. IPsec may operate in a host system or a security gateway. The SPD is established and maintained by a user or system administrator. Packets are selected for one of three processing modes based on IP and transport layer header information matched against entries in the SPD. Each packet is either discarded, bypasses IPsec or is afforded IPsec security services. In the case of a received IPsec packet, the rule stored in the packet policy database may be to forward the packet to the associated virtual machine for further processing, drop the packet or to perform other services.

The SPD specifies what services are to be offered to IP packets (datagrams) and how the services are to be applied. Traffic that is not allowed to be delivered is discarded, traffic that is allowed to pass without IPsec protection is allowed to pass through and the SPD may specify security services and protocols to be employed for traffic that is afforded IPsec protection.

Figure 3:
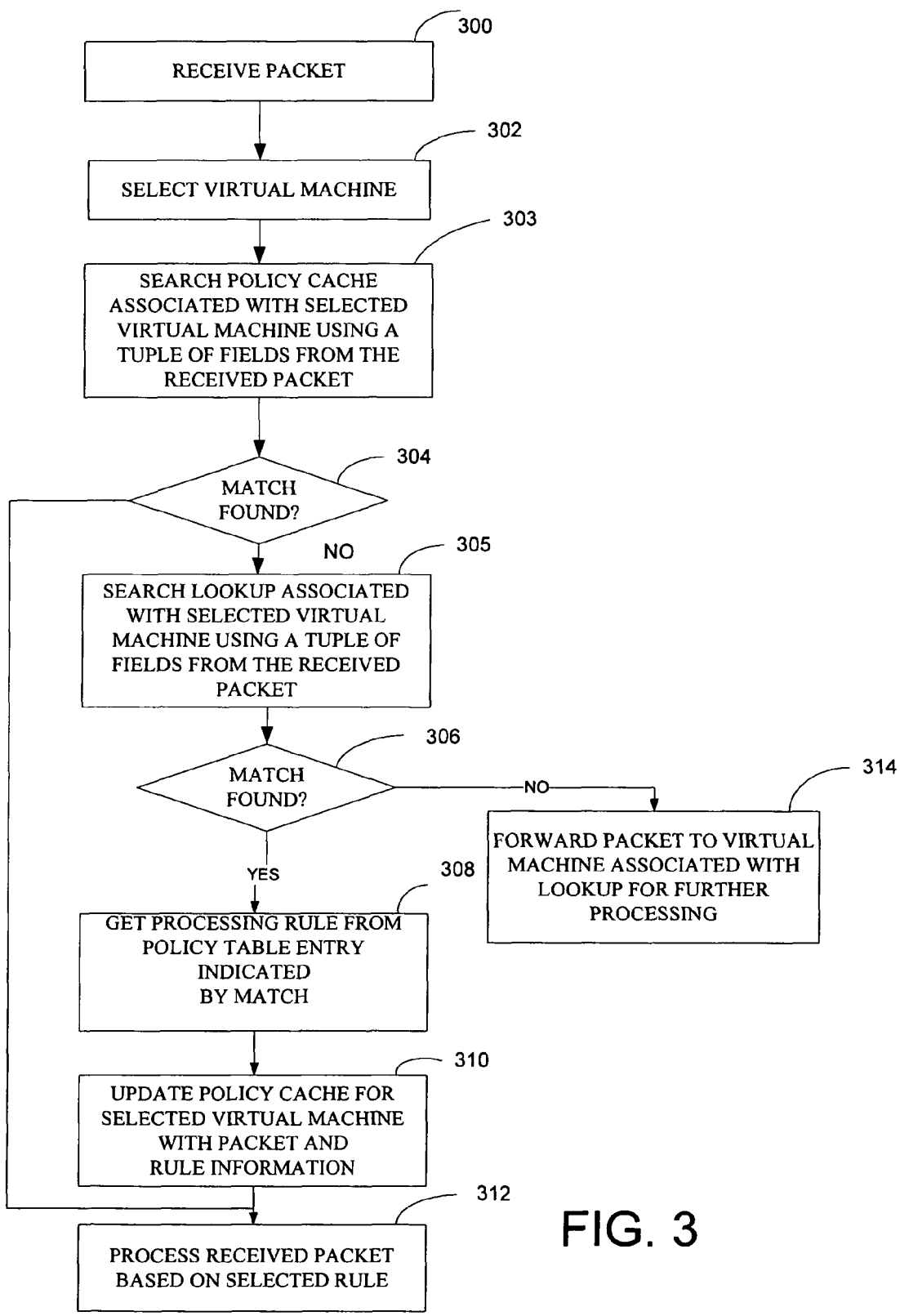
FIG. 3 is a flowchart illustrating an embodiment of a method for processing received packets in a system having a plurality of virtual machines.

FIG. 3 is a flowchart illustrating an embodiment of a method for processing received packets in a system having a plurality of virtual machines 124. FIG. 3 will be described in conjunction with FIGS. 1 and 2.

At block 300, a packet is received through the communication protocol interface 202 (FIG. 2). Processing continues with block 302.

At block 302, a virtual machine (VM) 124 (FIG. 1) is selected based on the incoming packet interface, that is, based on the network interface through which the packet was received. Processing continues with block 303

At block 303, a policy cache (VM cache) 212 associated with the selected VM 124 is searched using the result of a hash function performed on a tuple of fields from the header of the packet. Processing continues with block 304.

At block 304, if there is a matching entry in the VM cache 212, processing continues with block 312. If not, processing continues with block 305.

At block 305, a database lookup 214 (FIG. 2) associated with the virtual machine 124 (FIG. 1) receives a tuple of fields from the header of the packet. As discussed earlier, the database lookup 214 may use an RFC algorithm to perform a multi dimensional search for an index to a policy database 130 (FIG. 2) based on a key extracted from the received packet. If this is the first packet in a flow (that is, between a particular IP and/or level-4 source address and destination address) a rule (action) for the packet is discovered using the database lookup 214 (FIG. 2) to generate an index to the policy database 130. The database lookup 214 (FIG. 2) identifies an index for a rule stored in the policy database 130 (FIG. 1). The discovered rule may be already stored in the respective VM cache table 216 in memory 212. If this packet is not the first packet in the flow, there is already an entry and action in the respective VM cache table 216 which was previously created as will be discussed later in conjunction with block 310. Processing continues with block 306.

At block 306, if a match is found for the key in the database lookup 214 (FIG. 2), processing continues with block 308. If not, processing continues with block 314.

At block 308, the match (index) may be used to obtain the rule associated with the packet from the policy database (table) entry in the respective policy table 130 (FIG. 1) indicated by the index provided by the associated database lookup 214 (FIG. 2). Processing continues with block 310.

At block 310, a VM cache table 216 associated with the selected virtual machine 124 (FIG. 1) is updated with the packet and rule information. Processing continues with block 312.

At block 312, the received packet is processed based on the rule (policy) retrieved from the policy table 130 (FIG. 1). As previously discussed, the rule may indicate that the packet is to be discarded, forwarded to the virtual machine 124 (FIG. 1) for further processing or forwarded to a next hop without any further processing by the virtual machine 124 (FIG. 1).

At block 314, the database lookup 214 (FIG. 2) was unable to find a match based on the key extracted from the received packet, the packet is forwarded to the virtual machine 124 (FIG. 1) associated with the database lookup 214 (FIG. 2) for further processing.

In one embodiment, a security gateway includes a platform having a plurality of virtual machines 124 (FIG. 1). The security gateway analyzes and processes packets entering the platform.

In another embodiment Universal Thread Management (UTM) services are deployed in the platform in separate virtual machines (domains) 124 (FIG. 1) for added isolation. A UTM system typically has a large data throughput requirement. Thus, typically hardware acceleration is used to meet the required data throughput.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   a memory to store a plurality of database lookups and a plurality of policy databases, each database lookup associated with only one policy database and each policy database and database lookup pair associated with only one virtual machine, the policy database to store a processing policy associated with a received packet; and
   a packet classifier to direct the received packet to the policy database and database lookup pair associated with one of a plurality of virtual machines to identify the processing policy to handle the received packet,
   wherein the virtual machine identified to handle the received packet is dependent on a network interface through which the packet is received.

2. The apparatus of claim 1, wherein the policy database is a Security Policy Database (SPD), the policy database and database lookup pair to allow each virtual machine to have a different processing policy for handling a same key extracted from the received packet, the processing policy including a set of packet processing rules and security policies.

3. The apparatus of claim 2, wherein the received packet is an Internet Protocol Security (IPsec) packet.

4. The apparatus of claim 2, wherein the database lookup uses a Recursive Flow Classification (RFC) algorithm to provide an index to the SPD based on the key extracted from the received packet.

5. The apparatus of claim 4, wherein the key includes a tuple of a set of fields from headers included in the packet.

6. The apparatus of claim 5, wherein the set of fields include a Transport Control Protocol (TCP) source port field, a TCP destination port field, an Internet Protocol (IP) source address field and an IP destination address field.

7. The apparatus of claim 1, wherein each of the plurality of virtual machines includes an operating system that operates independently from the operating systems in the other virtual machines.

8. The apparatus of claim 1, wherein the memory to store a plurality of virtual machine cache tables, each virtual machine cache table associated with one virtual machine, the virtual machine cache table to store rules retrieved from the policy table.

9. An method comprising:
   providing a plurality of database lookups and a plurality of policy databases, each database lookup associated with only one policy database and each policy database and database lookup pair associated with only one virtual machine, the policy database to store a processing policy associated with a received packet; and
   directing the received packet to the policy database and database lookup pair associated with one of a plurality of virtual machines to identify the processing policy to handle the received packet,
   wherein the virtual machine identified to handle the received packet is dependent on a network interface through which the packet is received.

10. The method of claim 9, wherein the policy database is a Security Policy Database (SPD), the policy database and database lookup pair to allow each virtual machine to have a different processing policy for handling a same key extracted from the received packet, the processing policy including a set of packet processing rules and security policies.

11. The method of claim 10, wherein the received packet is an Internet Protocol Security (IPsec) packet.

12. The method of claim 10, wherein the database lookup uses a Recursive Flow Classification (RFC) algorithm to provide an index to the SPD based on a key extracted from the received packet.

13. The method of claim 12, wherein the key includes a tuple of a set of fields from headers included in the packet.

14. The method of claim 13, wherein the set of fields include a Transport Control Protocol (TCP) source port field, a TCP destination port field, an Internet Protocol (IP) source address field and an IP destination address field.

15. The method of claim 9, wherein each of the plurality of virtual machines includes an operating system that operates independently from the operating systems in the other virtual machines.

16. The method of claim 9, wherein the memory to store a plurality of virtual machine cache tables, each virtual machine cache table associated with one virtual machine, the virtual machine cache table to store rules retrieved from the policy table.

17. An article including a machine-accessible medium having associated information, wherein the information, when accessed, results in a machine performing:

providing a plurality of database lookups and a plurality of policy databases, each database lookup associated with only one policy database and each policy database and database lookup pair associated with only one virtual machine, the policy database to store a processing policy associated with a received packet; and directing the received packet to the policy database and database lookup pair associated with one of a plurality of virtual machines to identify the processing policy to handle the received packet, wherein the virtual machine identified to handle the received packet is dependent on a network interface through which the packet is received.

18. An system comprising:

a switch;

a memory to store a plurality of database lookups and a plurality of policy databases, each database lookup associated with only one policy database and each policy database and database lookup pair associated with only one virtual machine, the policy database to store a processing policy associated with a received packet; and a packet classifier to direct the received packet to the policy database and database lookup pair associated with one of a plurality of virtual machines to identify the processing policy to handle the received packet, wherein the virtual machine identified to handle the received packet is dependent on a network interface through which the packet is received.

\* \* \* \* \*